United States Patent [19]

Ferguson et al.

[11] 4,098,521

[45] Jul. 4, 1978

[54] WHEELCHAIR ADAPTABLE FOR PASSAGE IN NARROW SPACES

[75] Inventors: Andrew Marvin Ferguson, Merritt Island, Fla.; Ernest Voshell Keith, Dover, Del.

[73] Assignees: Reme Enterprises, Inc., Dover, Del.; National Patent Search Associates, Inc., Arlington, Va.

[21] Appl. No.: 712,969

[22] Filed: Aug. 9, 1976

[51] Int. Cl.[2] .......... B62M 1/14

[52] U.S. Cl. .......... 280/242 WC; 280/80 R; 280/247; 297/DIG. 4

[58] Field of Search .......... 280/242 WC, 638, 647, 280/5.2, 5.26, 5.28, 80 R, 247; 180/9.48, DIG. 3; 297/42, DIG. 4, 429

[56] References Cited

U.S. PATENT DOCUMENTS

| | | | |
|---|---|---|---|
| 2,495,573 | 1/1950 | Duke | 180/DIG. 3 |
| 2,561,616 | 7/1951 | Everest et al. | 280/242 WC |
| 2,978,053 | 4/1961 | Schmidt | 180/DIG. 3 |
| 3,122,395 | 2/1964 | Offner | 297/DIG. 4 |
| 3,216,738 | 11/1965 | Bockus | 280/30 |
| 3,282,605 | 11/1966 | Nihlean et al. | 297/DIG. 4 |
| 3,309,110 | 3/1967 | Bulmer | 280/244 |
| 3,381,973 | 5/1968 | Carr | 280/30 |
| 3,573,877 | 4/1971 | Locke | 280/5.2 X |
| 3,751,058 | 8/1973 | Larsen | 280/30 |
| 3,887,228 | 6/1975 | Ingerson | 280/242 WC |
| 3,893,708 | 7/1975 | Moroney | 297/242 WC |
| 3,917,312 | 11/1975 | Rodaway | 280/242 WC |
| 3,937,490 | 2/1976 | Mohamed | 280/242 WC |

*Primary Examiner*—Kenneth H. Betts

[57] ABSTRACT

A wheelchair that may be used by disabled persons as a normal self-propelled vehicle and is easily convertible to a narrow attendant-propelled wheelchair for negotiating narrow passages such as airplane aisles and bathroom doors in places not equipped for the accommodation of the disabled. Wheels secondary to the main drive wheels are mounted within the limits of the frame perimeter and are not in ground contact when the main drive wheels are in use. Upon tilting the wheelchair, the secondary wheels contact the ground raising the primary wheels and enabling their rapid removal, the resulting chair being narrowed substantially to the width of the occupant. Steerable castor wheels are mounted inboard of the frame members allowing turns in tight places, and shortened or removable arms are provided for ease of lateral movement from or to the chair. Secondary footrests and drive linkage for secondary wheels are also provided.

8 Claims, 9 Drawing Figures

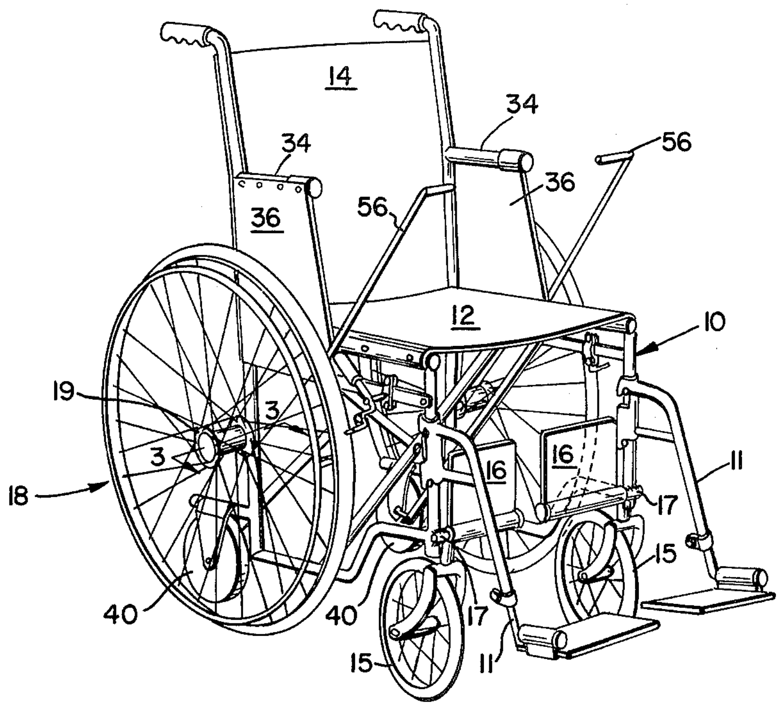
FIG. 1
FIG. 2
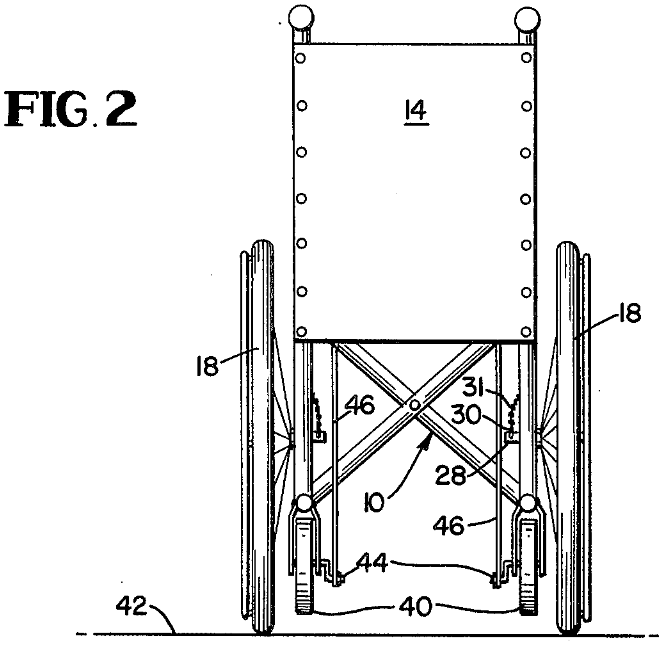

WHEELCHAIR ADAPTABLE FOR PASSAGE IN NARROW SPACES

BACKGROUND OF THE INVENTION

Disabled persons, reliant upon a wheelchair for mobility, are extremely inconvenienced and may be placed in the position of great physical discomfort owing to the lack of design consideration of their usual space requirements in many public and private facilities. Total immobility is experienced over long time periods when traveling by public transportation such as airplanes and buses. Narrow hallways and bathroom doors prevent their comfortable participation in many functions both public and private.

Width requirements for a normal self-propelled wheelchair are dictated by physical dimensions of the occupant, stability considerations, and considerations of weight and economics in construction.

In traveling, a disabled person normally is required to check his wheelchair for cargo transport and use an airport-provided, narrow, attendant-propelled chair for ingress to an airplane or the like. Once on the plane, the narrow chair is returned to the airport terminal with no provision for in-plane mobility. At the termination of a flight, a chair must be located at the receiving airport terminal and the passenger's chair claimed from cargo, frequently in carelessly handled condition. In other facilities, public, commercial, and especially private homes, little or no consideration is given to the special width and turning radius requirements of wheelchair reliant persons.

SUMMARY OF THE INVENTION

A foldable wheelchair is provided, the supporting frame construction being made in the conventional manner used by many manufacturers. The steerable castor wheels are mounted inboard of the main support frame rather than outboard as is more usual so that the caster's turning ability in narrow passages is increased. Removable foot and leg supports similar to those shown in U.S. Pat. No. 3,857,606 are preferably utilized to further decrease the minimum turning radius required in narrow spaces. Either short arms or removable arms are provided not projecting beyond the main support frame. Flexible clothing protectors preferably are utilized to prevent clothing contact with the main drive wheels when they are in use, and at the same time to allow for less restriction to the occupant's body as it naturally spreads out when seated.

The axles of the main occupant propelled wheels are threaded down to the bearing cones commonly used on this type of wheel, and lock nuts are screwed down upon these bearing cones to place the bearings in proper adjustment. Unthreaded axle housings are provided in the usual position on the main support frame of the chair into which the axles of the main drive wheels are inserted and secured by a pin lock or similar easily removable fitting. Secondary fixed wheels are fitted to the wheelchair frame, their axles being positioned rearward of the main drive wheel axles and so fitted that the secondary wheels are held out of contact with the traveled surface when the main drive wheels are in use.

The positioning of the secondary wheels is such that, when the wheelchair is tilted to the rear, the secondary wheels come in contact with the traveled surface and the main wheels are lifted from the surface. At this point, the occupant of the chair or an attendant may grasp the main wheels in the region of the hub and slide them out of their axle housings. The resultant attendant-propelled wheelchair has no projections from the sides and need be no wider overall than the seated width of the occupant. In the case of other than very obese persons, the resultant wheelchair width will allow its use through virtually any passageway usable by non-disabled persons, being particularly useful in transversing aircraft aisles, lavatory doorways and similar narrow passages commonly found in virtually all buildings not specifically designed for the needs of disabled persons.

An auxiliary method of self propulsion by a lever linkage to the secondary wheels is also included, as are secondary foldable footrests for use when the normal footrests are removed.

BRIEF DESCRIPTION OF THE DRAWINGS

Details of the preferred embodiments and principles of the invention will be made clear by an examination of the following description and accompanying drawings in which:

FIG. 1 is an overall front perspective view of the wheelchair of the present invention;

FIG. 2 is a rear elevational view of the wheelchair;

DESCRIPTION OF THE PREFERRED EMBODIMENTS

Figure 3:
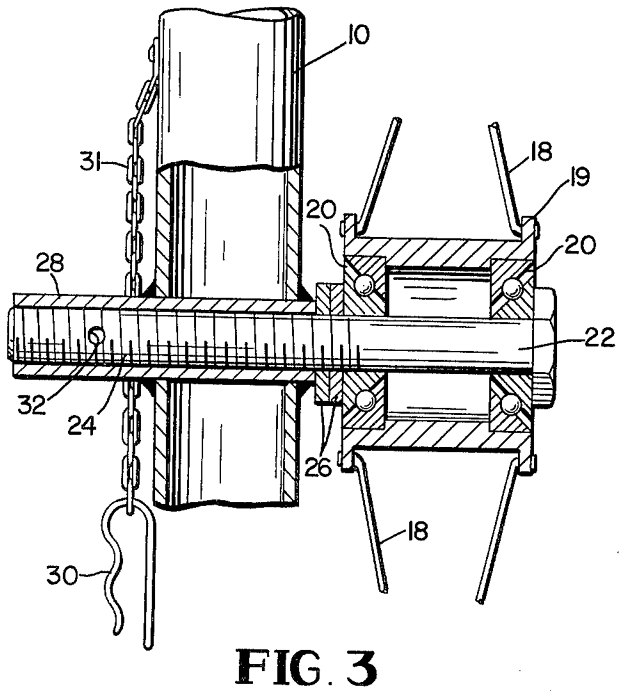
FIG. 3 is an enlarged sectional view taken substantially along line 3—3 in FIG. 1.
Figure 6:
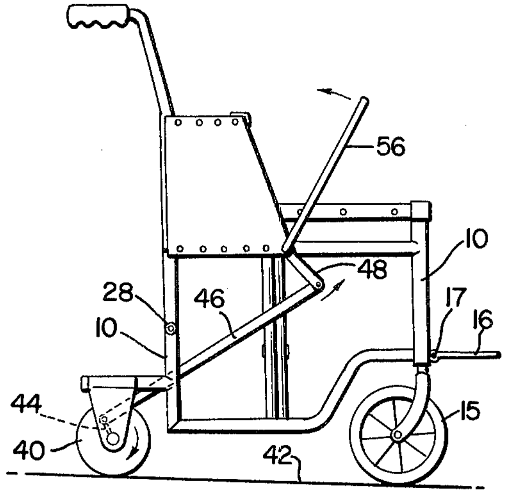
FIG. 6 is a side elevational view of the wheelchair with the main drive wheels removed.

A folding wheelchair frame 10 is provided, constructed of any suitable material and in any suitable manner, without the usual arms and clothing protector plates. Removable foot rests 11 preferably are mounted on the wheelchair frame 10 in the interest of reducing the minimum turning area requirements.

The overall width of the wheelchair frame is limited by the width of the seat sling 12 and back sling 14 which may be restricted in size substantially to that of the seated width of the occupant.

Steerable castor wheels 15 preferably are mounted inboard of the main frame 10 in any suitable manner. Secondary fold down footrests 16 are rotatably or otherwise movably mounted on projecting support arms 17 affixed to the wheelchair frame 10 in a convenient location, as shown in FIG. 1, which allows clearance for the rotation of the steerable castor wheels 15.

As shown in FIG. 3, a main drive wheel 18 and hub assembly 19 containing cone-type or radial thrust adjustable bearings 20 and an axle shaft 22 are used. The threaded portion 24 on the axle shaft 22 extends to the point where the axle passes from the hub bearings 20, and a pair of lock nuts 26 or similar means are used to maintin the hub bearings 20 in proper adjustment within the hub 19.

Axle carriers 28 are rigidly mounted on the wheelchair frame 10 in a suitable location. Each axle carrier 28 closely fits the exterior diameter of the axle shaft 22 and preferably is not provided with internal threads. The axle shafts 22 are removably secured within the axle carriers 28 by means of removable pin fasteners 30 or similar means, in the case shown by inserting the pin fastener 30 through matching holes 32 in the axis shafts 22 and the axle carriers 28. Each pin fastener 30 preferably is secured from loss by a chain 31 or similar means attached to the wheelchair frame 10.

The construction and mounting of the main drive wheels 18 and hubs 19, axle shafts 22, and axle carriers 28 are shown as an example of one method of utilizing parts presently common to a wheelchair construction. Within the scope of the invention, any other suitable construction and mounting may be utilized.

Referring to FIG. 1, short arm rests 34 are rigidly mounted on the wheelchair frame 10 in a suitable location and preferably extend only far enough from the wheelchair frame 10 to provide support for the elbows of the occupant. The short arm rests 34 may be provided with removable extension portions (not shown) so as to be extendable to the length of conventional full arm rests.

Clothing shields 36, preferably made from a suitable flexible material, such as leather or heavy fabric, are fastened to and extend between the short arms rests 34 and the main wheelchair frame 10 in a size and position which will protect the occupant's clothing from contact with the main drive wheels 18 when in use.

Figure 4:
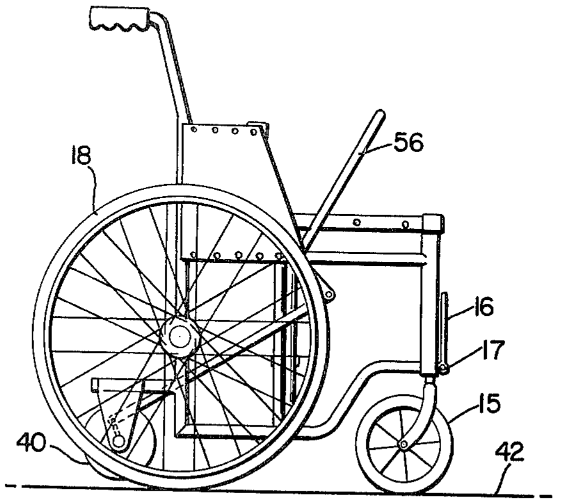
FIG. 4 is a side elevational view of the wheelchair illustrating the mounting position of the secondary wheels relative to the main drive wheels.
Figure 5:
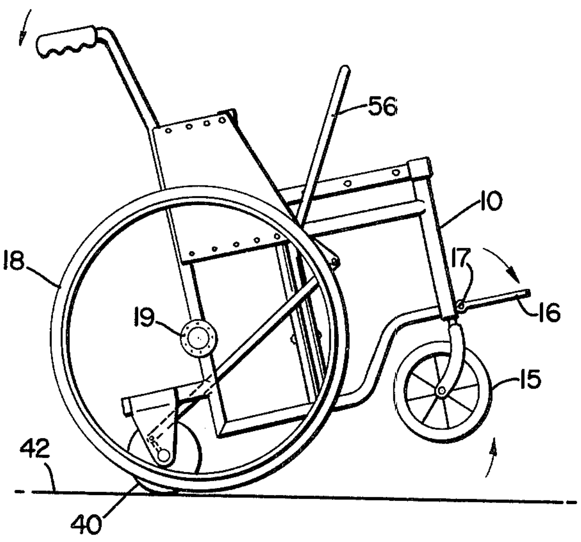
FIG. 5 is a view similar to FIG. 4, illustrating the engagement of the secondary wheels with the ground and lifting of the main drive wheels from the ground upon tilting of the wheelchair.

Secondary wheels 40 are affixed to the wheelchair frame 10 preferably just within the plane of the sides of the wheelchair frame, as shown in FIG. 2. The secondary wheels 40 preferably are rigidly mounted and non-steerable, although they may be of the steerable castor type. The mounting location of the secondary wheels 40 preferably is chosen so that they are not in contact with the traveled surface 42 when the main drive wheels 18 are in use, as shown in FIG. 4. Upon tilting the wheelchair frame 10, as shown in FIG. 5, the secondary wheels 40 contact the traveled surface 42 and the main drive wheels 18 are raised from the traveled surface 42.

Figure 7:
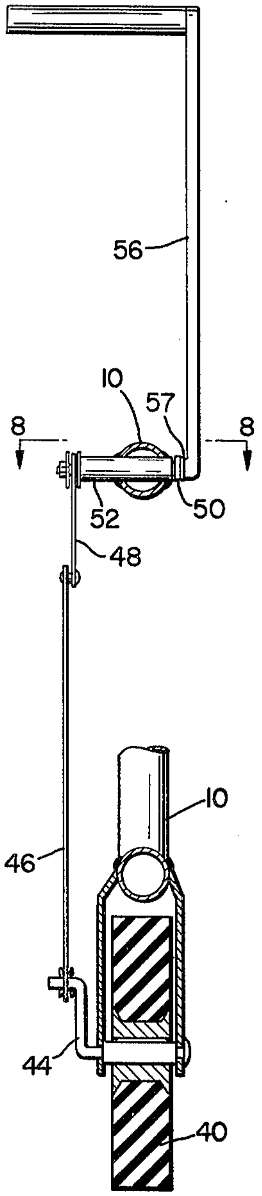
FIG. 7 is a partial sectional rear view of one embodiment of an apparatus for providing occupant propulsion to the secondary wheels.
Figure 9:
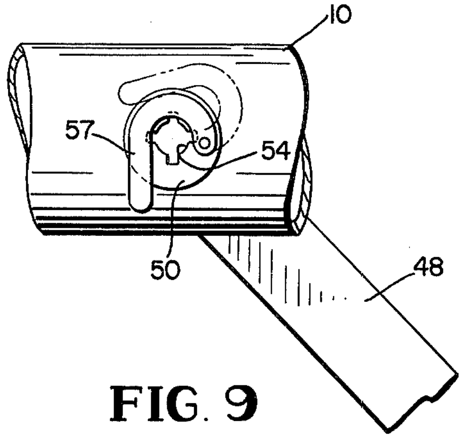
FIG. 9 is a side view taken along line 9—9 of FIG. 8, illustrating a securing means which may be used to retain the operating handles within their shafts.
Figure 8:
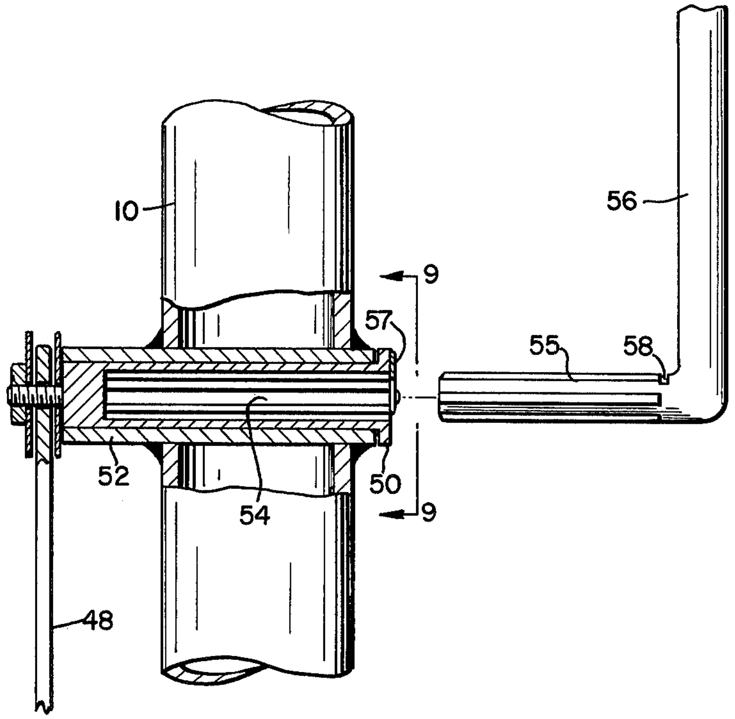
FIG. 8 is a sectional view taken along line 8—8 of FIG. 7, illustrating apparatus for removably mounting the operating handles powering the secondary wheels.

A driving means is illustrated in FIGS. 6–9 for self-propulsion by the occupant when the secondary wheels 40 are in use. The driving means preferably comprises crank arms 44 that are key-fitted or otherwise mounted on the secondary wheels 40 and rotatably attached to a link rod 46 which extends to a second arm 48 which is fixed to a shaft 50 rotatably mounted through a carrier 52. The shaft 50 and carrier 52 are mounted through the wheelchair frame 10 for convenient attachment or detachment of hand-operated levers 56, which may be used by the occupant of the wheelchair. Each hand-operated lever 56 is formed generally in a "C" shape, as shown in FIGS. 7 and 8, and has one end 55 formed to mate with a socket 54 in the shaft 50. A retaining clip 57, shown in FIG. 9, interlocks with a groove 58 in the operating handle 56 which retains the operating handle 56 in position within the socket 54 in the shaft 50.

In operation, the wheelchair with the main drive wheels 18 in place may be used as a normal wheelchair. In the event of a need to negotiate narrow passages, such as airplane aisles, narrow hallways or doorways, the wheelchair may be readily converted to a narrow mode.

To convert the wheelchair to a narrow mode, the main drive wheel axles 22 are removed from the wheelchair frame by removing the pin fasteners 30 and tilting the wheelchair frame 10 to the rear until the secondary wheels 40 contact the traveled surface 42 and the main drive wheels 18 are raised from the traveled surface 42. The occupant of the wheelchair may then slide the main drive wheels 18 and axles 22 from the axle carriers 28. This action reduces the wheelchair width to slightly greater than the seated width of the occupant so that narrow passages may be transversed. Should self-propulsion be desired, the hand operated levers 56 may be inserted into the sockets 54 in the shafts 50 and locked in place by the retaining clips 57. Motive force may then be applied by reciprocating or oscillating motion applied to the hand levers 56, transferred through the shafts 50 and arms 48 to the arms 46 and turned into rotating motion at the crank arms 44 connected to the secondary wheels 40. With the hand-operated levers 56 removed, the wheelchair may be used as an attendant-propelled wheelchair for narrow passages.

By removal of the footrests 11, the turning area required is reduced. The secondary folding footrests 16 may be used to support the feet and legs. The capability of turning or reversing direction in narrow passages is further enhanced by the positioning of the steerable castor wheels 15 inboard of the sides of the wheelchair frame 10.

The short arm rests 34 enable the occupant of the wheelchair to move sideways to alternate seating or a toilet without having to first move beyond the front edge of the wheelchair, which often results in overbalancing and tipping of the wheelchair. In addition, the short arm rests 34 and clothing protectors 36 securely position the occupant in the wheelchair for safety in negotiating uneven surfaces such as ramps without the risk of falling out which may occur in a chair with no arms.

What is claimed is:

1. A wheelchair convertible to a narrow mode while the occupant is seated therein, comprising:
   - a frame;
   - wheel means mounted on said frame near the front portion thereof;
   - main drive wheels removable mounted on said frame near the rear portion thereof, quick disconnect means on said drive wheels and said frame to enable said drive wheels to be mounted on and removed from said frame by the occupant while seated in the wheelchair in a lateral direction substantially parallel to the axis of rotation of said drive wheels; and
   - secondary wheels mounted on said frame near the rear portion thereof and disposed rearwardly of the axis of said main drive wheels, said secondary wheels and said wheel means being disposed laterally inwardly of said main drive wheels, said secondary wheels being positioned to be out of engagement with the support surface for the wheelchair when it is supported by said wheel means and said main drive wheels, and said secondary wheels being positioned to be engagable with said support surface upon predetermined rearward tilting movement of said wheelchair to lift said main drive wheels out of contact with said support surface to enable said main drive wheels to be quickly laterally removed from said frame by the occupant while seated in the tilted wheelchair and to enable said wheelchair to be supported thereafter by said secondary wheels and said wheel means in a narrow mode.

2. The wheelchair of claim 1 wherein said wheel means comprise a plurality of steerable castor wheels.

3. The wheelchair of claim 1 wherein said wheel means and said secondary wheels are disposed at least partially laterally inwardly of said frame.

4. The wheelchair of claim 1 wherein said secondary wheels are nonsteerable wheels.

5. The wheelchair of claim 1 further comprising manually actuatable drive means for said secondary wheels.

6. The wheelchair of claim 1 further comprising footrests removably mounted on the front portion of said frame.

7. The wheelchair of claim 1 wherein the width of said frame is substantially the same as the width of the seat portion of the wheelchair.

8. The wheelchair of claim 1 further comprising short armrests for providing support for the elbows of the occupant and facilitating movement of the occupant into and out of the wheelchair.

* * * * *